3,306,914
PREPARATION OF 3,4-BENZOCOUMARIN AND POLYSALICYLATES BY PYROLYSIS OF METAL SALTS OF HALOGEN SUBSTITUTED AROMATIC CARBOXYLIC ACIDS
Edward J. McNelis, Wallingford, Pa., assignor to Sun Oil Company, Philadelphia, Pa., a corporation of New Jersey
No Drawing. Filed Apr. 19, 1963, Ser. No. 274,324
15 Claims. (Cl. 260—343.2)

This application is a continuation-in-part of my copending application Serial No. 192,337, filed May 4, 1962, and now abandoned.

This invention relates in one aspect to a method for preparing 3,4-benzocoumarin which otherwise can be referred to as the lactone of 2'-hydroxy-2-biphenylcarboxylic acid or as 9-oxa-9,10-dihydrophenanthrene-10-one. The lactone prepared according to the invention has the following structural formula (Formula I):

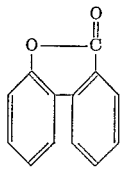

This compound has been prepared heretofore in several ways. One such procedure involves the Baeyer-Villager reaction in which fluorenone is oxidized by a peracid. Other procedures are described in Hawthorne et al. Patent No. 2,971,692 and No. 2,996,519. This lactone has utility as a rodent repellant and in stabilizing various materials such as plastics and fibers against the deteriorating effects of light.

The invention relates in another aspect to a method of preparing polysalicylates having the following generic formula (Formula II):

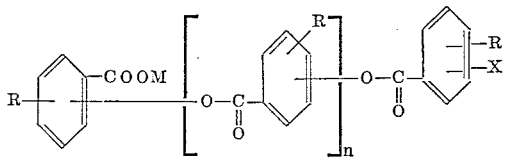

wherein M is a univalent metal, X is halogen, and R is hydrogen or an alkyl radical which is, along with certain other characteristics of the above polysalicylates, more fully defined hereinafter. The polysalicylates prepared by the method of the invention can be used to form polyester films and resins. The presence of a metal salt and halogen on the end groups of the polysalicylate facilitates the cross-linking of the latter with other compounds or polymers.

Both 3,4-benzocoumarin and the novel polysalicylates are prepared according to the invention by pyrolyzing univalent metal salts of certain halogen substituted aromatic carboxylic acids at certain specified temperatures. From o-halobenzoates either or both products can be obtained by proper selection of the pyrolysis temperature. Pyrolysis at 125°–375° C. or 250°–375° C., depending upon the specific o-halobenzoate, yields 3,4-benzocoumarin while pyrolysis of all of the specified o-halobenzoates at 125°–275° C. yields the polysalicylates. In the overlapping portion of these ranges, both products are obtained. From m- or p-halobenzoates or from alkyl substituted o-, m-, or p-halobenzoates the polysalicylates can be obtained while 3,4-benzocoumarin is not obtained. The pyrolysis temperature required for formation of the polysalicylate is 125°–400° C. in the case of m- or p-halobenzoates and alkyl substituted m- or p-halobenzoates and is 125°–275° C. in the case of an alkyl substituted o-halobenzoate.

In describing the invention those starting materials from which either or both 3,4-benzocoumarin and the polysalicylates can be prepared and the pyrolysis temperatures required for such preparation will be described first, after which those starting materials which upon pyrolysis yield the polysalicylates but which do not yield 3,4-benzocoumarin will be described. Finally, other aspects of the invention will be described.

According to one embodiment of the invention 3,4-benzocoumarin and/or polysalicylates of the type described above are prepared by pyrolyzing, at a temperature in the range of 125° to 375° C., ortho-halobenzoates having the following structure (Formula III):

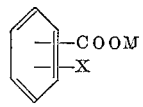

M in Formula III can be any univalent metal such as sodium, cesium, rubidium, gold, silver, copper (cuprous), etc. Univalent metals are defined more particularly as the metals of Group I-A and I-B of the Periodic Table.

X in Formula III is chlorine, bromine, or iodine. Fluorine is unsuitable for the present purpose and is not included in the term halogen as the latter is used herein.

These starting materials can be prepared by well known conventional techniques. For example, sodium or silver-o-bromobenzoate can be prepared by diazotizing anthranilic acid, treating the resulting diazonium salt with cuprous bromide in hydrobromic acid, heating the resulting complex to liberate o-bromobenzoic acid, treatment of the latter acid with sodium hydroxide to form the sodium salt, and treatment of an aqueous solution of the sodium salt with silver nitrate. The o-chloro and o-iodo salts are prepared in analogous manner by substituting cuprous chloride in hydrochloric acid and cuprous iodide in hydroiodic acid, respectively, for the cuprous bromide in hydrobromic acid.

Polysalicylates and/or 3,4-benzocoumarin are formed by pyrolyzing the above described starting materials (Formula III) at a temperature in the range of 125° to 375° C. The reaction which yields 3,4-benzocoumarin is as follows (Equation I):

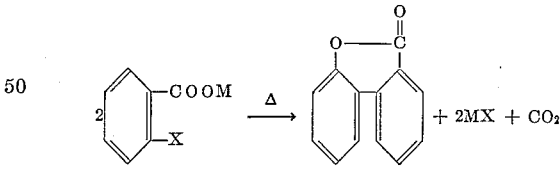

From the equation it can be seen that two moles of the o-halobenzoate form one mole of 3,4-benzocoumarin while releasing two moles of metal halide and one mole of $CO_2$.

The reaction which yields polysalicylate is as follows (Equation II):

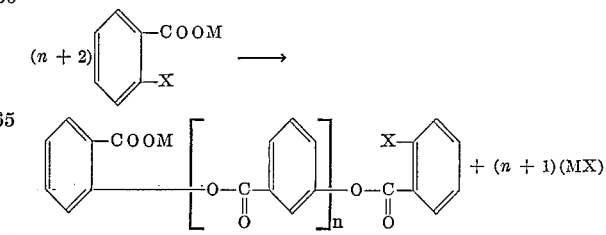

From the equation it can be seen that the polymerization occurs through the COOM and X radicals on adjacent molecules and, further, that except for two moles of starting material which become the end groups of the polymer, the M and X of the starting material are split off and released as metal halide.

As described, the pyrolysis should be conducted at a temperature in the range of 125° to 375° C. Within this range of all of the specified starting materials will pyrolyze to at least one of the products of the invention. Within this temperature range the preferred temperatures or, as the case may be, the necessary temperatures will vary depending upon the specific metal and halogen in the starting material and upon the product or products desired. With respect to the product desired the reaction resulting in the formation of polysalicylate from a given starting material usually proceeds more readily, ie.., at a somewhat lower temperature, than the reaction by which 3,4-benzocoumarin is formed from the same starting material. In addition, the optimum temperature from a yield standpoint varies depending upon the particular univalent metal present in the starting material. Silver-o-halobenzoate reacts according to Equations I and/or II above at a relatively low temperature, alkali metal-o-halobenzoates react in such a manner at relatively high temperatures, while the other univalent metal-o-halobenzoates so react at temperatures intermediate between the silver and alkali metal-o-halobenzoates. Moreover, the yield of product itself will vary depending upon the metal present. Thus silver-o-halobenzoates generally give higher yields of product than the corresponding alkali metal-o-halobenzoates with the yields obtained from the other univalent metal-o-halobenzoates being intermediate to these. In order to form polysalicylates the pyrolysis temperature should be in the range of 125° to 275° C. Within this range the yield of polysalicylate is maximized when the temperature is in the range of 140° to 225° C. for a silver-o-halobenzoate starting material, in the range of 200° to 250° C. for an alkali metal-o-halobenzoate starting material, and in the range of 180° to 220° C. for a starting material containing any of the other specified univalent metals. Thus the overall preferred range is 140° to 250° C. Within the preferred range for alkali metal-o-halobenzoates (200°–250° C.) the optimum temperature will vary depending upon the particular alkali metal present and generally increases in the following order: cesium, rubidium, potassium, sodium, and lithium.

Not only does the optimum temperature vary depending upon the univalent metal present in the starting material but it also varies depending upon the particular halogen present in the starting material. The o-iodobenzoates react according to Equations I and/or II at lower temperatures and produce 3,4-benzocoumarin and/or polysalicylates in better yield than do the o-bromobenzoates, and the latter are better in these same respects than the o-chlorobenzoates. Consequently, the pyrolysis temperature is desirably varied within the above specified preferred ranges depending upon the halogen present. For example, in the case of silver-o-halobenzoate the preferred range stated above is 140° to 225° C. If the starting material is silver-o-iodobenzoate the pyrolysis is desirably carried out at a temperature in the lower portion of this range while if the starting material is silver-o-chlorobenzoate, the temperature is desirably in the higher portion of this range.

It should be noted that any of the specified starting materials (Formula III) react to form polysalicylates at any temperature in the range of 125° to 275° C. The preferred temperature ranges relate to optimizing the yield of polysalicylate and thus allow the most efficient practice of the invention.

In order to form 3,4-benzocoumarin the pyrolysis should be carried out at a temperature in the range of 250° to 375° C. in the case of alkali metal-o-halobenzoate starting materials and should be carried out at 125° to 375° C. in the case of the other metal-o-halobenzoate starting materials. While the overall temperature range is 125° to 375° C. the alkali metal-o-halobenzoates do not react to form 3,4-benzocoumarin in other than negligible amounts below 250° C. Preferably the pyrolysis temperature for conversion of alkali metal-o-halobenzoates to 3,4-benzocoumarin is in the range of 300° to 340° C. As in the case of the polysalicylates the optimum temperature from a yield standpoint varies depending upon the particular alkali metal and halogen present. The variation is similar to that described in connection with the polysalicylate preparation. Thus, the optimum temperature increases in the following order: alkali metals—cesium, rubidium, potassium, sodium and lithium; halogens—iodine, bromine, and chlorine.

When forming 3,4-benzocoumarin by pyrolysis of the other o-halobenzoate starting materials the temperature should be in the range of 125° to 375° C. For silver-o-halobenzoates, which react to form 3,4-benzocoumarin more readily and in better yield than the other metal-o-halobenzoates, the pyrolysis temperature is preferably in the range of 140° to 225° C., although higher or lower temperatures within the 125° to 375° C. range can be used if desired. The optimum pyrolysis temperature for starting materials which contain a univalent metal other than silver or an alkali metal is about 180° to 250° C., although higher or lower temperatures can also be used. Within these preferred ranges for preparing 3,4-benzocoumarin from o-halobenzoates containing a metal other than alkali metal, the optimum pyrolysis temperature again varies depending upon the specific halogen in the starting material. The relationship is as described previously, i.e., the optimum temperature increases in the following order: iodine, bromine, and chlorine.

It is apparent from the above discussion that the maximum preferred pyrolysis temperature is 340° C. while the minimum preferred pyrolysis temperature is 140° C. Consequently the preferred temperature range over which all the specified starting materials will pyrolyze to at least one of the products of the invention is 140° to 340° C.

It is also apparent from the above discussion that some of the temperature ranges for preparing polysalicylates and 3,4-benzocoumarin overlap. Thus pyrolysis of silver-o-iodobenzoate at 140° C. results in the formation of both polysalicylate and 3,4-benzocoumarin. At temperatures at which both products are formed the relative amounts of each can be influenced to some extent by the rate at which the starting materials are brought up to the pyrolysis temperature. Slow heating favors the formation of polysalicylate while rapid heating favors the formation of 3,4-benzocoumarin.

According to another embodiment of the invention polysalicylates having the aforesaid generic formula (Formula II) can be prepared by pyrolysis of starting materials which are defined by the following structural formula (Formula IV) and the discussion immediately thereafter.

M is any univalent metal as previously described. Similarly X is chlorine, bromine, or iodine. In addition, the position of X can be ortho, meta, or para with respect to the COOM radical. R in the above formula can be hydrogen or certain alkyl radicals. However, the case where R is hydrogen and X is ortho to the COOM radical is the embodiment of the invention discussed initially. Hence for the purpose of Formula IV above, R is an alkyl group when the X and COOM radicals are ortho to each other and R is hydrogen or alkyl when the X and COOM radicals are meta or para to each other.

The alkyl radicals suitable for the present purpose contain 1–4 carbon atoms and are, in addition, primary or secondary alkyl radicals. Thus tertiary butyl is not a suitable alkyl radical for the present purpose. Alkyl radicals containing more than 4 carbon atoms and bulky alkyl radicals such as tertiary butyl result in considerable steric hindrance with the result that upon heating of the starting material little or no polymerization occurs.

Also to avoid steric hindrance and the aforementioned results of same, the relative position of the R, COOM, and X radicals on the benzene nucleus in the above formula must meet certain characteristics. The COOM and X radicals can be in any position with respect to each other, i.e., they can be ortho, meta, or para with respect to each other. On the other hand, each of the nuclear carbon atoms to which the COOM and X radicals are attached must have at least one unsubstituted nuclear carbon atom adjacent thereto. For example, the COOM radical is attached to a nuclear carbon atom. This nuclear carbon atom has adjacent to it two nuclear carbon atoms, one on each side. The requirement for the present purpose is that at least one of these two adjacent nuclear carbon atoms be unsubstituted, i.e., at least one will have only hydrogen and 2 other nuclear carbon atoms attached to it. Where R is hydrogen this requirement is illusory for it cannot be avoided; where R is an alkyl radical, however, this requirement limits the position of the alkyl radical with respect to the COOM and X radicals.

The reason for the above requirement will be apparent from Equation II. The polymerization occurs through the X and COOM radicals on adjacent molecules. If either of these radicals is fully surrounded by other radicals, there is sufficient steric hindrance to prevent the polymerization from occurring to any significant extent.

The above-described starting materials can be prepared by well known, conventional techniques. For example, silver or sodium-m-chlorobenzoate can be prepared by chlorination of benzoic acid at room temperature in the presence of ferric chloride to form m-chlorobenzoic acid which can then be converted to sodium-m-chlorobenzoate by treatment with sodium hydroxide. Treatment of aqueous sodium-m-chlorobenzoate with silver nitrate produces silver-m-chlorobenzoate. Similarly, potassium-3-chloro-4-methylbenzoate is obtained by chlorination of p-toluic acid followed by treatment with potassium hydroxide.

The above-described starting materials yield polysalicylates upon pyrolysis within one of two temperature ranges, the range itself depending upon the relative position of the X and COOM radicals in the starting material and the optimum temperature within the range again depending upon the metal and halogen present in the starting material.

Where the X and COOM radicals are ortho to each other, in which case R will be an alkyl radical and the starting material will therefore be an alkyl-o-halobenzoate, the pyrolysis should be conducted at a temperature in the range of 125° to 275° C. It will be noted that this is the same temperature range as that specified hereinbefore for pyrolyzing o-halobenzoates to polysalicylates. As with the o-halobenzoates the optimum temperature within this 125° to 275° C. range varies depending upon the specific metal and halogen present. The effect of the particular metal and halogen present in the starting material is the same as described previously, i.e., the reaction occurs at relatively low temperature when the metal is silver, at relatively high temperatures when the metal is an alkali metal, and at intermediate temperatures when other univalent metals are employed. The preferred temperature ranges for the pyrolysis of alkyl-o-halobenzoates are the same as in the previous discussion, 140° to 225° C. when the metal is silver, 200° to 250° C. when the metal is an alkali metal, and 180° to 220° C. for the remaining univalent metals. Within these preferred ranges the optimum temperature will vary somewhat depending upon the halogen employed, and as described previously, generally increases in the following order: iodine, bromine, chlorine. Similarly, within the 200°–250° C. range the optimum temperature varies according to the specific alkali metal, the variation being as described previously.

When the X and COOM radicals in the starting material are meta or para to each other and R is either hydrogen or alkyl, the starting material polymerizes at a temperature in the range of 125° to 400° C. Here also the optimum temperature varies depending upon the metal and halogen employed and preferably is in the range of 150° to 250° C. when the metal is silver and preferably is in the range of 250° to 350° C. when the metal is an alkali metal. Thus the overall preferred range is 150° C. to 350° C. Within these preferred ranges the optimum temperature will vary in the manner described previously depending upon the specific halogen present. Likewise, within the alkali metal preferred temperature range the optimum temperature will vary with the particular alkali metal employed in the manner described previously.

The preferred metals for use in the invention are silver and the alkali metals. Silver is preferred because it reacts more readily and generally gives a better yield of product. The alkali metals are preferred because they are generally less costly and more readily available. Iodine and bromine are the preferred halogens for the same reasons that make silver a preferred metal.

By way of summary, Table I below summarizes the operable and preferred temperature ranges for certain preferred starting materials and for each product.

TABLE I

| Starting Material | Temperature Range Required to Form | | | |
|---|---|---|---|---|
| | 3,4-benzocoumarin | | Polysalicylate | |
| | Operable Range | Preferred Range | Operable Range | Preferred Range |
| o-Halobenzoate | | | 125–275 | |
| a. Metal is silver | 125–375 | 140–225 | | 140–225 |
| b. Metal is alkali metal | 250–375 | 300–440 | | 200–250 |
| Alkyl-o-Halobenzoate | None | | 125–275 | |
| a. Metal is silver | | | | 140–225 |
| b. Metal is alkali metal | | | | 200–250 |
| m- or p-Halobenzoate | None | | 125–400 | |
| a. Metal is silver | | | | 150–250 |
| b. Metal is alkali metal | | | | 250–350 |
| Alkyl-m- or p-Halobenzoate | None | | 125–400 | |
| a. Metal is silver | | | | 150–250 |
| b. Metal is alkali metal | | | | 250–350 |

The characteristics of the polysalicylates prepared by the method of the invention such as structural formula, molecular weight, etc., will depend mainly upon the starting material employed and/or the temperature employed, and/or the time for which the starting material is heated.

The relative position of the various radicals in the polysalicylate will correspond to their position of the starting material. Thus if the COOM and X radicals are para to each other in the starting material, the

radicals in the repeating units will be para to each other. In addition, the nuclear carbon atoms to which the COOM, X, and

radicals in the polymer are attached will have at least one unsubstituted nuclear carbon atom adjacent thereto.

The molecular weight of the polysalicyate will depend primarily upon the temperature and time of heating and is directly proportional to each of these variables. For any specified starting material a heating period of 20–120 minutes at a temperature within the specified preferred range for that starting material will usually produce a polysalicylate having an $n$ (see Formula II hereinbefore) in the range of 4 to 39. This range of $n$ corresponds to a molecular weight of the polysalicylate in the range of approximately 800 to 5000. By employing higher temperatures, within the specified upper limit, or longer heating periods polysalicylates having a higher value for $n$ up to a maximum of about 81 can be prepared. The maximum molecular weight corresponding to an $n$ of 81 is approximately 10,000. By employing lower temperatures within the specified lower limit or shorter heating periods, polysalicylates having a lower value for $n$ down to a minimum of about 2 can be prepared. The minimum molecular weight corresponding to an $n$ of 2 is approximately 500. It will be apparent, of course, that for any given molecular weight polysalicylate the value of $n$ will vary depending upon the particular univalent metal, halogen, and R radical in the starting material. Thus a polysalicylate having a molecular weight of 7000 and formed from lithium-o-chlorobenzoate will have an $n$ of approximately 56 while a polysalicylate of the same molecular weight but formed from silver-o-iodobenzoate will have an $n$ of approximately 54.

Where 3,4-benzocoumarin is the desired product the time of heating the starting material will generally be in the range of 5–120 minutes, although within this range the time will vary somewhat depending upon the metal and halogen in the starting material.

Whether the desired product is 3,4-benzocoumarin or polysalicylate or both, the pyrolysis can be conducted in any convenient manner. One convenient method is to charge the starting material to a steam heated autoclave, heat to the desired temperature and hold there for the desired period of time. While the starting materials of the invention are solids at room temperature most of them melt at temperatures on the order of 125° to 250° C. It is not essential, however, that the starting materials be in the liquid state for the reactions resulting in the formation of 3,4-benzocoumarin and polysalicylates to proceed. Regardless of the product being prepared, the pyrolysis can be effected at atmospheric or higher pressure but preferably is carried out under subatmospheric pressure so that any non-salt by-products (and any 3,4-benzocoumarin) are removed from the pyrolysis zone as soon as they are formed. The use of reduced pressure thus helps to avoid undesirable decomposition reactions and to increase the yield of polysalicylate or 3,4-benzocoumarin. Also to discourage side reactions, the pyrolysis should be conducted in a manner to exclude air and moisture.

Separation of 3,4-benzocoumarin and/or polysalicylate from the reaction product mixture and from each other depends to some extent on the manner in which the reaction was carried out. In describing suitable separation procedures it will be assumed that both 3,4-benzocoumarin and polysalicylate were formed in the pyrolysis reaction and, further, that it is desired to isolate each of these products separately.

When the pyrolysis is carried out under vacuum, the 3,4-benzocoumarin and most of the non-salt by-products distill from the pyrolysis zone and are subsequently condensed. The non-salt by-products are mainly halobenzene, phenyl-o-halobenzene, and xanthone. Remaining in the pyrolysis zone are polysalicylate, salt by-products such as metal halide, and, in some cases, a very small amount of the non-salt by-products.

3,4-benzocoumarin can be separated from the condensate containing same by mixing the condensate with benzene, acetone, or ether, filtering to remove any insoluble matter, washing with water if necessary to remove unreacted starting material, and then evaporating the solvent. From the residue 3,4-benzocoumarin can be recovered in high purity in various ways such as by fractional distillation and/or fractional crystallization from a suitable solvent such as methanol, ethanol, or benzene-hexane mixtures.

Another procedure for separating the 3,4-benzocoumarin from the condensate comprises passing the condensate dissolved in a suitable solvent such as benzene through a chromatographic column containing alumina. The general order in which the products pass out of the column is as follows: halobenzene, phenyl-o-halobenzoate, xanthone, and 3,4-benzocoumarin. By collecting the effluent in suitable fractions, these materials can be isolated individually.

Polysalicylate is separated from the reaction product mixture which remained in the pyrolysis zone by a procedure which involves working up the mixture with a ketone such as acetone or with an ether. Any non-salt by-products present dissolve in the acetone while polysalicylate and metal halide remain undissolved and are then separated by, say, filtration. The insoluble portion is washed with water to remove the metal halide and give relatively high purity polysalicylate. Further purification of the polysalicylate can be effected by a procedure which involves dissolving the relatively high purity polysalicylate in chloroform, and filtering to remove any insoluble matter. Upon distilling the solution to remove the chloroform an oily residue is obtained from which residue essentially pure polysalicylate can be obtained by precipitation from ether, ligroin, etc. Thus the oily residue is mixed with ligroin and the precipitate, essentially pure polysalicylate, is separated by, said, filtration.

When the reaction is carried out under conditions at which the 3,4-benzocoumarin and polysalicylate remain in the pyrolysis zone, analogous procedures can be used to separate 3,4-benzocoumarin and polysalicylate. For example, the reaction product mixture is worked up with ether or acetone and the insoluble matter separated. The insoluble matter is mainly the polysalicylate but will also contain some metal halide and, in some cases, a small amount of non-salt by-products. Essentially pure polysalicylate can be separated from such impurities by the procedure described previously, i.e., water washing, dissolution in chloroform, filtration, distillation, and precipitation from ether. The solution which results from working up the reaction mixture with ether or acetone contains the 3,4-benzocoumarin and essentially all of the non-salt by-products. The 3,4-benzocoumarin can be separated according to the procedures described previously, such as by chromatographic separation or by washing the solution with water followed by distillation and fractional crystallization.

Where only one of the products of the invention is present in the reaction product mixture it can be separated by the appropriate procedures described above.

The following examples illustrate the invention more specifically.

Example I

A flask was charged with 11.54 g. of potassium o-iodobenzoate and was alternatively evacuated and purged with nitrogen several times. The flask was placed in a bath maintained at 320° C. and heated at substantially atmospheric pressure while a slow stream of nitrogen was passed therethrough. The reactant melted when its temperature reached 275° C. and a slow evolution of gas occurred. At 315° C. vigorous evolution of gas occurred and the temperature rose to 333° C. due to exothermic reaction. The flask was then removed from the bath and allowed to cool. The total time that the temperature was above 310° C. was 14 minutes. The reaction mixture was triturated with ethyl ether and filtered to separate potassium iodide and any other undissolved material, and the ether was evaporated. 1.81 g. of a red oily residue were obtained. This material was dissolved in petroleum ether and benzene and treated in a chromatographic column containing acid-washed alumina. The material was eluted therefrom by means of benzene, ethyl ether and methanol added in the order named. Small amounts of products identified as iodobenzene, phenyl-o-iodobenzoate and xanthone were eluted from the column and thereafter 3,4-benzocoumarin was removed, being concentrated mainly in a benzene fraction obtained after the xanthone removal. Very little material was removed by the ether and methanol following the benzene eluent. Evaporation of the benzene fraction gave 0.674 g. of 3,4-benzocoumarin of high purity. The yield of the 3,4-benzocoumarin was about 17% based on theoretical. This material was identified by comparison of its infrared spectrum and retention time in vapor phase chromatography with the same properties of the 3,4-benzocoumarin prepared in known manner by the Baeyer-Villager reaction of fluorenone.

Example II

A 300 ml. Aminco bomb was charged with 4.78 g. of potassium-o-bromobenzoate and was then charged with $CO_2$ until the pressure in the bomb was 100 p.s.i.g. The bomb was heated to and held at 300–312° C. for 15 minutes. The pressure fluctuated both during the period the bomb was being heated up and also during the 15 minute period. The maximum pressure was 225 p.s.i.g. and the final pressure was 162 p.s.i.g. After the 15 minute period the bomb was opened and allowed to cool. The reaction mixture was treated in the same manner as in Example I. The amount of 3,4-benzocoumarin recovered was 0.129 g. This material was identified by infrared analysis and vapor phase chromatography as in Example I.

Example III

A flask was charged with 2.456 g. of silver-o-iodobenzoate and was purged with nitrogen. The flask was heated to 80° C. at substantially atmospheric pressure while a stream of nitrogen was slowly passed therethrough. At 80° C. a rapid exothermic reaction took place at which point vigorous evolution of gas occurred and the temperature rose to 155° C. After 30 minutes at 155° C. the flask was allowed to cool. The reaction product mixture was treated in the same manner as in Example I. The ether soluble portion of the reaction product mixture weighed 0.530 g. The amount of 3,4-benzocoumarin recovered was 0.136 g. This material was identified by infrared analysis and vapor phase chromatography as in Examples I and II.

Example IV

In a flask maintained at 30 mm. Hg pressure 4.02 g. of silver-o-iodobenzoate was heated to and held at 200° C. for one hour after which period the flask and its contents were cooled to room temperature by standing at room temperature. The reaction product mixture was then mixed with 150 ml. of acetone and the undissolved portion separated by filtration. This undissolved portion was then mixed with 150 ml. of diethyl ether and the undissolved portion again separated by filtration. The acetone and ether solubles of the reaction product mixture weighed a total of 0.170 g. They were then mixed and found to contain, by infrared analysis and vapor phase chromatography, 3,4-benzocoumarin. The undissolved portion resulting from the ether treatment was then mixed with 150 ml. of chloroform and the undissolved material removed by filtration. The weight of material which dissolved in the chloroform was 1.631 g. This chloroform solution exhibited in the infrared spectrum bands characteristic of esters. Upon distillation of the chloroform solution a viscous oily residue was obtained. This residue was mixed with 10 ml. of chloroform to improve its fluidity and was then mixed with 150 ml. of ligroin. An off-white precipitate formed which was separated and dried. The dried precipitate weighed 1.226 g. and was identified by the above-mentioned infrared spectrum, elemental analysis, and by the nature of the product obtained upon hydrolysis of the precipitate as,

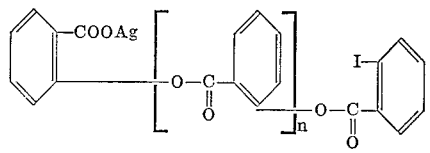

wherein $n=6.55$ (Mol. Wt.=1260). The actual elemental analysis obtained and the theoretical analysis for the above compound is as follows:

| Element | Actual | Theoretical |
|---|---|---|
| C | 55.0 | 57.0 |
| H | 3.1 | 2.7 |
| O | 21.8 | 21.7 |
| Ag | 8.8 | 8.6 |
| I | 9.7 | 10.0 |
|  | 98.4 | 100.0 |

The failure of the actual analysis to total exactly 100% is not surprising since it represents an independent analysis for each element, i.e., no analysis is determined by difference. The proximity of the actual analysis (98.4%) to the theoretical (100%) is actually considered quite good.

A sample of the polymer was treated with NaOH and was then acidified. The product was mainly salicylic acid which shows that the bracketed portion of the polysalicylate in the above formula in a salicylic acid monomer.

Example V

Potassium-o-bromobenzoate (2.38 g.) was heated to and held at 240° C. for 30 minutes while being maintained at atmospheric pressure and in an atmosphere of nitrogen. During the 30 minute heating period 8.9 mg. of $CO_2$ were given off. By treating the reaction product mixture with acetone, diethyl ether, etc. as in Example I a polysalicylate was isolated which, by infrared analysis and hydrolysis, was determined to have the structure shown in Formula II hereinbefore where R is hydrogen, M is potassium, and X is bromine.

I claim:
1. Method which comprises heating a compound having the structural formula

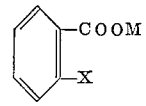

wherein M is a univalent metal and X is selected from the group consisting of chlorine, bromine, and iodine, to a temperature in the range of 125° to 375° C., and separating from the reaction product mixture a compound selected from the group consisting of (I) 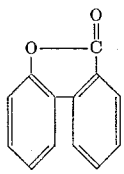

and (II) 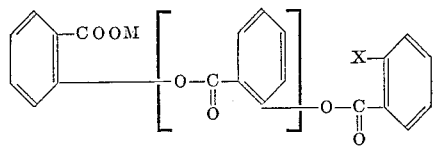

wherein $n$ is in the range of 2 to 81.

2. Method according to claim 1 wherein said temperature is in the range of 140° to 340° C.

3. Method according to claim 1 wherein M is selected from the group consisting of alkali metals and silver.

4. Method according to claim 1 wherein X is iodine.

5. Method according to claim 4 wherein said temperature is in the range of 140° to 250° C. and the compound separated is II.

6. Method according to claim 4 wherein M is an alkali metal, said temperature is in the range of 300° to 340° C., and the compound separated is I.

7. Method according to claim 4 wherein M is silver, said temperature is in the range of 140° to 225° C., and the compound separated is I.

8. Method of preparing 3,4-benzocoumarin which comprises heating a compound having the structural formula

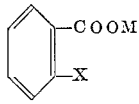

wherein M is a univalent metal and X is selected from the group consisting of chlorine, bromine and iodine, to a temperature in the range of 250° to 375° C., and separating 3,4-benzocoumarin from the reaction product.

9. Method of preparing a polysalicylate which comprises (1) heating a compound having the formula

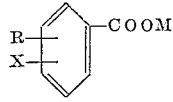

wherein X is selected from the group consisting of chlorine, bromine, and iodine, M is a univalent metal, and wherein R is, when the X and COOM radicals are ortho to each other, selected from the group consisting of primary and secondary alkyl radicals containing 1–4 carbon atoms, and R is, when the X and COOM radicals are para and meta to each other, selected from the group consisting of hydrogen and primary and secondary alkyl radicals containing 1–4 carbon atoms, and wherein each of the nuclear carbon atoms to which the COOM and X radicals are attached have at least one unsubstituted nuclear carbon atom adjacent thereto, said heating being at a temperature in the range of 125° to 275° C. when the COOM and X radicals are ortho to each other and at a temperature in the range of 125° to 400° C. when the COOM and X radicals are para and meta to each other, and (2) separating from the reaction product a polysalicylate having the formula

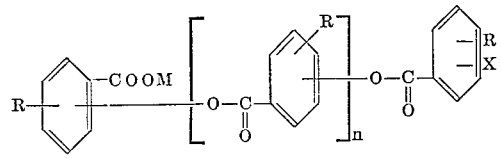

wherein $n$ is in the range of 2 to 81.

10. Method according to claim 9 wherein R is hydrogen.

11. Method according to claim 9 wherein the first mentioned temperature is in the range of 140° to 250° C. and the last mentioned temperature is in the range of 150° to 350° C.

12. Method according to claim 9 wherein M is selected from the group consisting of alkali metals and silver.

13. Method according to claim 9 wherein X is iodine.

14. Method according to claim 13 wherein M is silver, the first mentioned temperature is in the range of 140° to 225° C., and the last mentioned temperature is in the range of 150° to 250° C.

15. Method according to claim 13 wherein M is an alkali metal, the first mentioned temperature is in the range of 200° to 250° C. and the last mentioned temperature is in the range of 250° to 350° C.

References Cited by the Examiner

UNITED STATES PATENTS 2,600,376   6/1952   Caldwell _____ 260—78.3
2,728,747  12/1955   Aelony _____ 260—78.3

OTHER REFERENCES

Gilkey, Journal of Applied Polymer Science, Vol. 2, No. 5, pp. 198–202, September 1959, TP1 J92.

WILLIAM H. SHORT, *Primary Examiner.*

J. C. MARTIN, M. GOLDSTEIN, *Assistant Examiners.*